(12) United States Patent
Hofmann

(10) Patent No.: US 7,584,828 B2
(45) Date of Patent: Sep. 8, 2009

(54) CLAMPING AND/OR BRAKING DEVICE

(76) Inventor: Klaus Hofmann, Birkenweg 10, 85567 Bruck (DE)

( * ) Notice: Subject to any disclaimer, the term of this patent is extended or adjusted under 35 U.S.C. 154(b) by 353 days.

(21) Appl. No.: 10/567,305

(22) PCT Filed: Jul. 30, 2004

(86) PCT No.: PCT/DE2004/001712

§ 371 (c)(1),
(2), (4) Date: Jul. 19, 2006

(87) PCT Pub. No.: WO2005/015047

PCT Pub. Date: Feb. 17, 2005

(65) Prior Publication Data

US 2007/0090610 A1     Apr. 26, 2007

(30) Foreign Application Priority Data

Aug. 5, 2003   (DE)   .................... 10335795

(51) Int. Cl.
*B65H 59/10* (2006.01)
(52) U.S. Cl. ....................... 188/67; 188/166
(58) Field of Classification Search ................... 188/43, 188/67, 166; 92/89, 90
See application file for complete search history.

(56) References Cited

U.S. PATENT DOCUMENTS

| 2,988,058 | A | * | 6/1961 | Warnecke | 188/67 |
| 3,663,027 | A | | 5/1972 | Klipping | |
| 4,543,877 | A | | 10/1985 | Emmert | |
| 4,564,088 | A | * | 1/1986 | Takahashi et al. | 188/67 |
| 5,662,020 | A | * | 9/1997 | Morita et al. | 188/67 |

FOREIGN PATENT DOCUMENTS

WO       WO 01/34990 A1       5/2001

* cited by examiner

*Primary Examiner*—Melanie Torres
(74) *Attorney, Agent, or Firm*—The Culbertson Group, P.C.

(57) ABSTRACT

The invention concerns a clamping and/or braking device with a housing, in which at least one plate-like element is held, supported at a first end opposite a stop area of the housing. A second end transfers clamping and/or braking forces to an object, or acts on a pressurizable element, which transfers clamping and/or braking forces to an object. The plate-like element has at least one bending area which is convex in the starting state, which is constructed pressure-resistant and nevertheless elastically deformable so that the bending area forms an elastic element between the stop area of the housing and a pressurizing end of the plate-like element. A pressure space is formed between the convex side of the bending area and the housing. Some embodiments include multiple plate-like elements.

22 Claims, 5 Drawing Sheets

CLAMPING AND/OR BRAKING DEVICE

TECHNICAL FIELD OF THE INVENTION

The invention concerns clamping or braking devices with a housing a platelike elements held therein to transfer force by bending under pressure.

BACKGROUND

Clamping or braking devices are known in the most varied embodiments for the most varied application cases. Thus, a braking device of a linear guide is known in published European Patent Application No. EP-A-0936366 that has a supporting body and can be moved along a guide track. The supporting body has brake shoes, which act on the two longitudinal sides. The supporting body is shaped like an H and has a thin, elastically flexible crosslink and two lower legs, with which it grips the guide track. A brake shoe is located between a lower leg and the guide track. The supporting body is provided with two upper legs, which, together, form a holding space with the crosslink, in which a force-producing means, acting on the upper leg, is provided. This can be hydraulically or pneumatically actuatable toggle lever mechanics or a piezoelectric actuator. Moreover, a hydraulically or pneumatically actuatable wedge valve can be provided as a force transducer, which is conducted in a formed space, which tapers in the longitudinal direction of the brake device, between the upper legs of the supporting body. In all cases, a bending of the elastic crosslink takes place due to the force pressurization of the two upper legs, so that the two lower legs are moved inwards with the brake shoes or apply pressure on the guide track with a large force.

The disadvantage with this known brake device, in connection with the use of an electromechanical transducer such as a piezoelectric element, is, in particular, its sensitivity with respect to vibrations or other mechanical loads.

The use of a toggle lever or a wedge valve, just like an electromechanical transducer, means a high installation or production expense.

In addition, there is, in particular with clamping devices, the requirement of sufficiently high clamping forces, which, with known devices, can be implemented only with a relatively high construction and thus financial expense.

From U.S. Pat. No. 5,855,446, a hydraulic clamping bushing is known, which is aligned on a shaft and can be connected to it, for example, in a stationary manner. The bushing essentially has a stable bushing body, which is located at a distance around a drive shaft. Adjacent to these bushing bodies and facing the shaft, a chamber which can be acted on with pressure is provided. A side wall of this chamber, which extends essentially parallel to the shaft is used here, at the same time, as a braking element, which with the action of pressure on the chamber is pressed against the shaft by the expansion of the chamber, in order to produce a friction-locking connection. A Σ-shaped formation of the laterally adjacent walls of the chamber is meant to prevent the bushing from aligning crooked with respect to the wall when the pressure acts on chamber. The Σ-shaped side walls of the chamber make possible, in the case of pressure pressurization, an expansion of these side walls in a radial direction toward the shaft, before the increasing chamber pressure also presses the chamber wall, running parallel to the shaft, against the shaft. Thus, the bushing can be aligned at right angles to the shaft axis, before the tortional connection is produced.

This clamping device does not have a favorable power transmission for the creation of a higher pressing force. Furthermore, in its shape and in particular, in its placement possibility relative to the bushing body, the chamber is limited. The braking effect can be attained here only by acting on the chamber with excess pressure, and the actual braking element, which must perhaps transfer high driving forces, is not firmly connected to the bushing body, but rather only via the inevitably relatively unstable pressure chamber.

From published PCT Patent Application No. WO 01/34990 A1 from the applicant, a clamping and/or braking device is known, in which a chamber which can be acted on with pressure is provided on a basic body; in at least one partial area of at least one deformable or tension-resistant and/or pressure-resistant wall, the chamber is limited. The limitation of the chamber opposite the wall can also be constructed like the first wall. However, it can also be a rigid part of a body. Preferably, the walls lie at a relatively small distance from one another. The forces resulting from the deformation of the chamber are conducted, at least in part, in the direction of or along the wall and in the area of the connection of the wall to a basic body are introduced into the latter. If one selects the point of attack of such forces on the basic body, and if this basic body is, at least partially, elastically deformable, then the forces can be transferred, for example, into the clamping or braking areas via this basic body on other sites of the basic body. A corresponding braking or clamping means in these areas can then be moved, by means of the forces, into a pressurizing position or out of it, so as to brake or release a guide element or an element which has to be clamped or braked. Both applied excess or reduced pressure in the chamber can be used thereby, in order to introduce both tractive and compressive forces to the basic body. Of course, before and after the introduction of force, the clamping and/or braking areas are still engaged with the guide element or the element to be clamped or braked, wherein, however, changes in the pressurizing forces between the clamping and/or braking areas and the other element result.

This known clamping and/or braking device is based on the knowledge that when acted on by a reduced or excess pressure, a suitable chamber tends to a deformation. If this chamber, to a great extent, is formed by at least one approximately plane wall, then the excess or reduced pressure in the chamber first causes a deformation in a first direction running essentially perpendicular to this wall. In order to yield to the deformation (expansion or contraction) in this first direction, the result from this, in a correspondingly reverse manner, is a contraction or expansion of the chamber in a second direction generally running perpendicular to the first direction (that is, essentially parallel to the wall). The fact is used thereby that low forces or deformations in the first direction produce large forces in the second direction, which can be used to brake or clamp or to release pretensioned clamping or braking devices.

SUMMARY OF THE INVENTION

Provided is a clamping and/or braking device, which can be produced with lower construction expense and with which sufficiently high braking or clamping forces can be produced in a simple manner.

The invention is based on the knowledge that by means of at least one plate-like element, which is located in a housing and has a convex bending area, a clamping and/or braking device can be produced at low cost; this device can also produce very high clamping and/or braking forces by means of an only gaseous pressure medium—that is, pneumatically. However, it is clear that a hydraulic actuation of the device is also possible. The function of the device is guaranteed by the convex formation of at least one bending area of the plate-like element, with application on its convex side of an excess pressure from a pressure medium, wherein a corresponding pressure space is provided on the side of the bending area, which curves convexly outwards. With pressure acting on the bending area, its curvature is reduced, so that the expansion of the plate-like element between two ends is increased, of which one is supported on the housing and the other acts, directly or indirectly, via a pressurizable element, on the object to be clamped or braked. The plate-like element is thereby so pressure-resistant and constructed so elastically deformable in the at least one bending area that between the two ends, an elastic element is formed. The pressure resistance of the plate-like element must be designed in such a way that when a predetermined, maximum permissible force is exerted on the second end (pressurizing end), a sharp bending does not occur.

Of course, a corresponding free space, which makes possible a sufficient bending of the bending area, must be present on the concave side of the bending area, turned away from the pressure application side. This free space can be connected to the surroundings—that is, to the air pressure of the surroundings. However, it can also be closed airtight so that the bending of the bending area must take place, against an increasing pressure, in the free space.

Contrary to the known device of the applicant, it is possible, with these embodiments, to produce or to change clamping and/or braking forces, without hereby having to deform an essentially rigid body. In this way, aside from a simple construction, a small model results. The device is, moreover, simple to produce, since only the plate-like element must be placed in the housing.

Contrary to the known clamping bushings, which have relatively soft walls, and which increase the distance between a pressurizable element and a base element when acted on with excess pressure, it is also possible with the device in accordance with the invention to produce a predetermined clamping and/or braking force, with which the object to be clamped or braked is acted on, even in a pressure-less state during a corresponding pretensioned installation of the device in the complete device. In this way, for example, a control of the device is possible, in such a way that a change between a braked (in the pressure-less state) movement of the pressurized object and a complete clamping of the object (with a sufficient pressurization) results.

The more frequent use of the device in accordance with the invention, however, is the one where in the pressure-less starting state, the object is not acted on and with a pressurization of the device, is braked or clamped.

With a linearly functioning clamping and/or braking device, the at least one plate-like element can have a, for example, rectangular shape, wherein the entire element can be convexly curved between two edges. The first and the second ends are then formed by those edges or end areas between which the curvature runs. At least in the area of the bending (if the entire plate-shaped element is not bent), the side edges must be essentially sealed off with respect to the housing (a small leakage can be tolerated, under certain circumstances, if, for example, compressed air is used as the pressure medium and the required pressure can be attained and maintained in spite of the leakage)

According to one development of the invention, a pressurizable element is provided, which is constructed in one piece with the housing and as a part of the housing, or which is constructed as a part connected to the housing in a detachable manner, wherein the pressurizable element is constructed deformably in such a way that with a pressure application of the pressure space, a movement of at least one section of the pressurizable element takes place in the direction of the object or the transferable clamping and/or braking forces, produced by the at least one plate-like element, are transferred to the object. With such a deformable pressurizable element, the pressure space can be sealed of in a simple manner, with respect to the at least one plate-like element—namely on the pressurizing edge or the second end of the plate-like element, with respect to the pressurizable element. Basically, however, a pressurizable element is not connected to the housing can also be used, which, for example, can be constructed correspondingly large for the distribution of the pressing force on a greater surface. Moreover, the pressurizable element can be used to adapt the pressing surface (constructed then on the pressurizable element) to the shape of the object.

In a development of the invention, the first end of the at least one plate-like element can be connected to the housing, especially if in the realization of a linearly acting clamping and/or braking device, a pressurizable element not connected to the housing is used or the object is acted on directly by the second end of the at least one plate-like element.

In the preferred embodiment of the invention, the first end of the at least one plate-like part, however, is supported, without a firm connection, against the housing. With the presence of a pressurizable element, the second end of the at least one plate-like part is also preferably supported, without a firm connection, against the pressurizable element. In this way, a simple installation of the device results.

According to one embodiment of the invention, the at least one-plate-shaped element is annular, preferably, circular, so as to create a device that makes possible the clamping of bar- or rod-shaped objects, in particular, in the cross section of circular-cylindrical objects.

The ring-shaped, plate-like element can be shaped convexly, in the starting state, via essentially the entire radial cross section, wherein essentially the entire ring-shaped wall of the ring-shaped, plate-like element serves as the bending area. Such a plate-like element can be produced very simply and at low cost and can be used also for a large number of variants.

The at least one ring-shaped, plate-like element preferably has radial slits that are open inwardly or outwardly, wherein, preferably, the second end—that is, the pressurizing end of the ring-shaped, plate-like element—is formed by the inside or outside end of the ring-shaped, plate-like element. The slits preferably extend to just before the opposite end of the ring and are present in such a number that proceeding from the closed ring area, individual sections extend inwardly or outwardly. These sections reduce the required deformation of the ring in the azimuth direction, if the curvature of the convex bending area is reduced during pressurization.

With such slit, ring-shaped, plate-like elements, it is possible to provide one or more sealing elements, preferably, in the shape of a deformable layer, on a part or on the entire surface of the plate-like element, on the inside and/or outside surfaces of the plate-like elements, relative to the pressure space, at least in the area of the slits. In this way, a common pressure space can be used for the individual sections between the slits. The sealing of the slits can, for example, take place by vulcanizing on a relatively hard, but nevertheless, sufficiently deformable rubber layer. Such a layer can be produced even on the side of the ring-shaped, plate-like element, turned away from the pressurization, without the danger of loosening the layer during a pressurization.

In the preferred embodiment of the invention, the bending of the at least one bending area of the at least one plate-like element is limited in such a way that after the discontinuation of the pressurizing of the pressure space with excess pressure as a result of the elastic effect of the at least one bending area, it returns to the starting state. One designates, as the starting state, the pressure-less state, wherein in this state also, depending on the dimensioning or installation of the clamping and/or braking device, the at least one bending area can be pretensioned. A corresponding stop for the bending area can be formed, for example, by an inside housing wall.

According to one development of the invention, several plate-like elements, arranged essentially parallel to one another, can be provided, whose second ends have a predetermined distance to one another, in order to transfer clamping and/or braking forces to the object, via a prespecified expanded area, wherein for each plate-like element, a separate pressure space or for several or all plate-like elements, a common pressure space can be formed.

When using several plate-like elements, at least one pair of plate-like elements can be provided, whose first and second ends are directly adjacent or at a close distance to one another, and whose convex bending areas run convexly outwards, relative to the other plate-like element of the pair of plate-like elements, wherein a common pressure space is provided for the pressurization of the bending areas of the two plate-like elements of a pair. This variant offers the advantage that the two plate-like elements are pressed against one another during a pressurization and so the space required between the two elements can be sealed off with lower pressure in a simple manner. For example, the rubber coating mentioned in the preceding can be provided inside or can be a sealing element connected to the inside surfaces of the plate-like elements.

In addition, the plate-like elements of a pair can be designed in such a way that they lie close to one another, with at least one partial area of the sides facing one another in an ending state when acted on with an excess pressure greater or equal to a prespecified maximum pressure, wherein the ending state is defined by a suitable formation of the bending areas in such a way that from the ending state, an automatic return to the pressure-less starting state takes place. In this way, a plate-like element is used as a stop for the at least one bending area of the other plate-like element.

According to one embodiment of the invention, a pressurizable element can be provided, which is constructed rigid in the entire area in which the several plate-like elements are active. In this way, a more uniform transfer of the clamping and/or braking forces can be attained on the object.

With all embodiments of the invention, the creation of the clamping and/or braking forces, however, takes place exclusively or at least, for the most part, predominantly due to one pressurization and the bending hereby produced and thus the change of the effective expansion of the plate-like elements between the two ends. This is also true for the case that one surface of the pressurizable element is acted on completely or partially with pressure, if the bending area(s) of the plate-like elements are acted on with pressure. The forces hereby produced, which are comparable with the forces arising with common clamping bushings, can be practically neglected however.

In another embodiment of the invention, the housing and the pressurizable element can be designed as essentially H-shaped bodies, wherein the at least one plate-like element and the pressure space are provided between the essentially parallel, upper legs of the H-shaped body, wherein clamping and/or braking areas are provided on the essentially parallel, lower legs of the H-shaped body for the transfer of the clamping and/or braking forces to the object and wherein the H-shaped body is elastically deformable in the area of the middle crosslink and/or the connecting areas of the middle crosslink with the legs of the H.

In a similar manner, the housing and the pressurizable element can be designed as essentially U-shaped bodies, wherein the at least one plate-like element and the pressure space are provided between the essentially parallel legs of the U-shaped body, wherein clamping and/or braking areas are provided on the essentially parallel legs of the H-shaped body for the transfer of the clamping and/or braking forces on the object and wherein the U-shaped body is elastically deformable in the area of the base of the U and/or in the area of the legs of the U.

Other embodiments of the invention may be described or claimed herein.

The invention is explained in more detail below, with the aid of the embodiment examples shown in the drawing. The figures in the drawing show the following:

DETAILED DESCRIPTION OF PREFERRED EMBODIMENTS

Figure 1A:
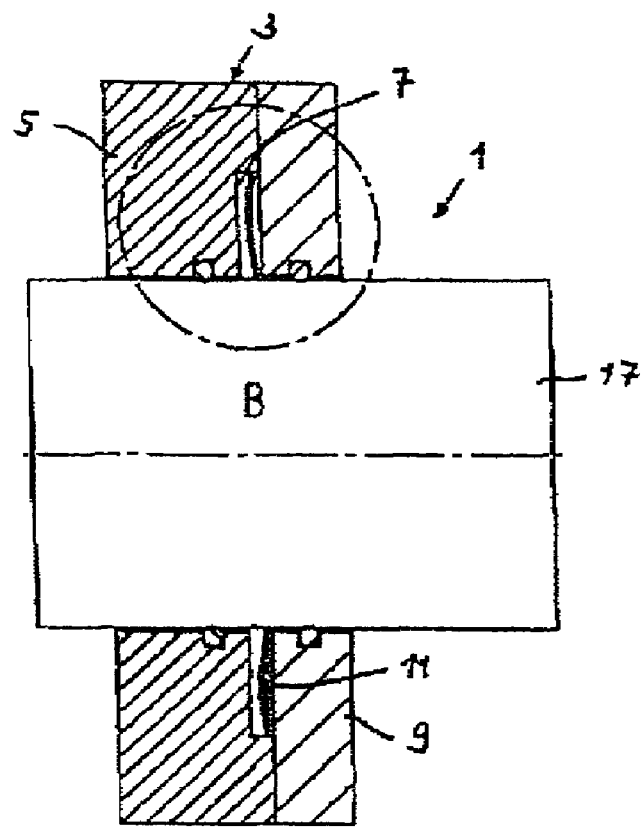
FIG. 1a is a longitudinal section and FIG. 1b is a detail enlargement of a first embodiment of a clamping and/or braking device, according to the invention, for the pressurizing of a circular-cylindrical object, using a ring-shaped, plate-like element.

FIG. 1a shows a schematic longitudinal section of an embodiment of a clamping and/or braking device 1 with a ring-shaped housing 3, which consists of a first part 5 with a ring-shaped recess 7 and a second part 9, which is connected to the first part 5, for example, screwed to it. In the recess 7, between the first and second housing part 5, 9, a ring-shaped, plate-like element 11 is located. The ring-shaped, plate-like element 11 is shaped slightly convex in the radial section and applies pressure on the circumferential wall of the ring-shaped recess 7 of the first housing part 5 with its outside end or its outside boundary 11a.

Figure 1B:
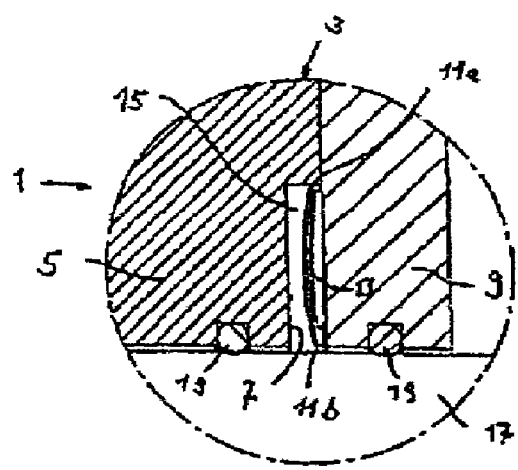
Figure 2A:
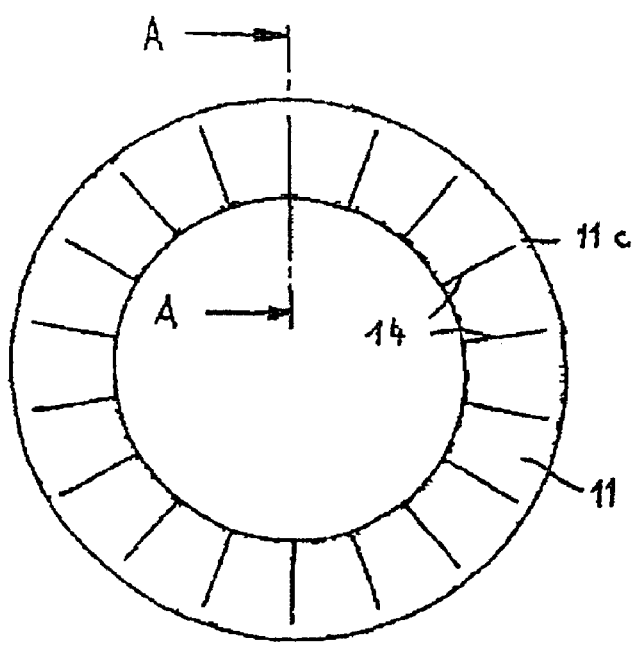
FIG. 2a is a top view of the ring-shaped, plate-like element in FIG. 1 and a detail enlargement in sectional view along the line A-A (FIG. 2b).
Figure 2B:
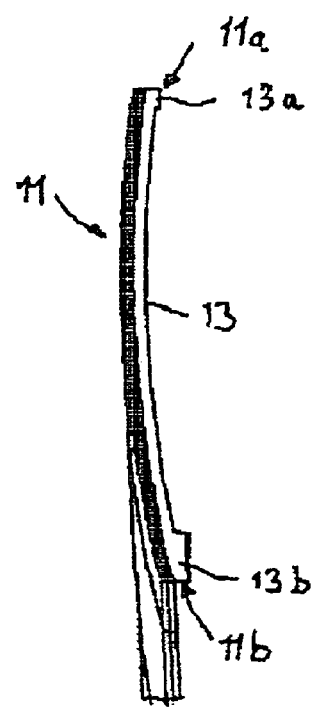

As can be seen from FIG. 1b, the ring-shaped, plate-like element 11, consisting, for example, of a steel sheet, can be connected, on one side, to a sealing element 13, for example, a relatively hard, but still sufficiently deformable rubber ring. The ring-shaped, plate-like element 11 is, as shown in FIGS. 2a and 2b, provided with a large number of slits 14, which proceeding from an outside boundary area 11c, which is also closed in the shape of a ring, run radially inwards and open toward the inside.

The ring-shaped, plate-like element 11 defines, together with the sealing element 13, on its convex side, together with the inside wall of the first housing part 7, a pressure space 15, to which a pressure medium can be supplied, for example, compressed air. Of course, however, a liquid pressure medium can also be used. The pressure space 15 is constructed open toward the inside in the embodiment shown in FIG. 1 and must be sealed off, with respect to the object 17 to be acted on, for example, a rotatable shaft. This can take place by means of corresponding sealing elements 19, which can be designed as O rings. The O rings 19 can be taken up in grooves in the inside walls of the first and second housing part 5, 9.

The ring-shaped, plate-like element 11 lies close to the inside wall of the second housing part 9 in the embodiment example shown in FIG. 1, with its outside and inside boundaries 11a, 11b, wherein the sealing element sufficiently seals off the space between the concave surface of the element 11 and the inside wall of the housing part 9. In this respect, an annular area 13a, 13b of the sealing element can be constructed on the outside and inside boundary. The inside annular area 13b can be designed so far, in its radial expansion, that it lies close to the inside wall of the housing part 9, at least with a partial area over the entire movement path of the element 11. The space between the concave side of the element 11 and the housing part 9 can also be connected to the surroundings, via one or more (not depicted) canals.

If the pressure medium is conducted under a certain pressure to the pressure space 15, via one or more (not depicted) supply canals, then the ring-shaped, plate-like element 11 is bent in the direction of the second housing part 9—that is, the curvature is reduced. In this way, the sections of the element 11, stretching inwards between the slits 14, are moved, with its inside boundary 11b, further inwards in the direction of the object 17, so that a desired braking or clamping force can be exerted on the object by a certain pressure of the pressure medium. The element 11 must, of course, be so dimensioned and be made of such a material that at least in one bending area, there is a sufficient deformability and moreover, the element 11 is constructed sufficiently pressure-resistant as a whole that even with the maximum producible clamping or braking force, which acts on the inside end of the element 11 or is exerted on the object 17 by it, no sharp bending of the element 11 or even a plastic deformation occur.

The inside wall of the second housing part 9 is also used as a stop for the ring-shaped, plate-like element 11, so that even with high pressures, an abrupt reverting of the convex curvature to a concave curvature cannot occur. Moreover, the inside wall of the second housing part 9 and/or the ring-shaped, plate-like element 1 or the sealing element 13 can be constructed in such a way that the curvature of the element 11 is reduced, as a maximum, so much that with a subsiding of the pressure, the elastic effect of the element 11 ensure that the element 11 again returns to the curvature present in the pressure-less starting state. In this respect, the inside wall of the housing part 9 can be constructed, for example, slightly convex in the direction of the element 11 or one or more stop elements can be provided on the inside wall of the housing part 9 or on the element 1 or on the sealing element 13.

At this point, it should be noted that the sealing element can, of course, also be provided on the outside convex side of the element 11. In this case, it is also possible to use a loose sealing element, not connected to the element 11, for example, a separate, ring-shaped sealing disk made of rubber or plastic.

Figure 3A:
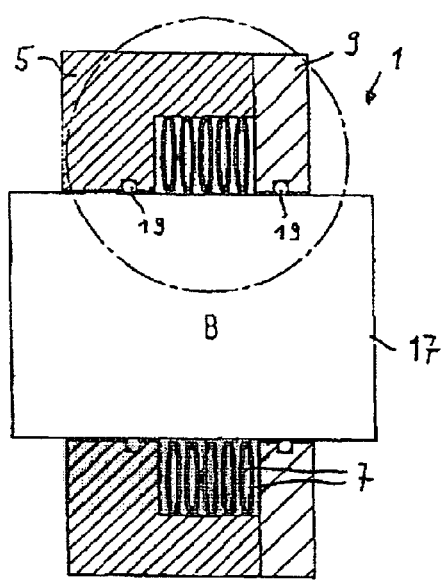
FIG. 3a is a longitudinal section and FIG. 3b is a detail enlargement of a second embodiment of a clamping and/or braking device according to the invention for the pressurization of a circular-cylindrical object, using several pairs of ring-shaped, plate-like elements.
Figure 3B:
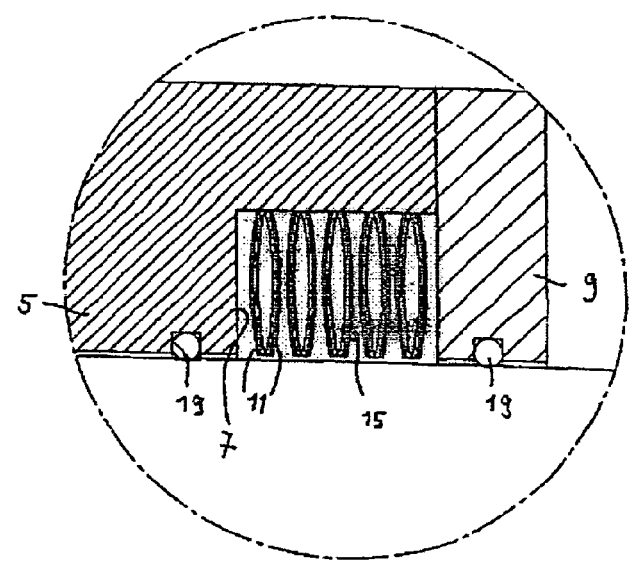

The embodiment of a clamping and/or braking device shown in FIG. 3 is similar to the embodiment in FIG. 1. Instead of a single ring-shaped, plate-like element 11, five pairs of ring-shaped, plate-like elements 11 as a whole, are, however, provided in this embodiment. In this way, ten times the braking or clamping forces can be transferred to the object 17 with the same pressure of the pressure medium.

The two ring-shaped, plate-like elements 11 of a pair are placed thereby in such a way that their concave sides oppose each other. In this way, a space sealed-off with respect to the pressure space 15, in which the elements 11 of the pairs of elements, sealed off with respect to each other, is formed, in a simple manner, between each pair of elements 11. With an pressurization of the pressure space 15 with the pressure of the pressure medium, the slit walls of the elements 11 are there to be bent toward one another. Since the inside ends 11b of the elements 11 of a pair move jointly, a sealing off of the space between the elements 11 can be reliably attained with simple means. The outside boundaries of the elements 11 can, of course, also be held, for the fixing, by suitable means in the housing 3, for example, in grooves in the circumferential wall of the cylindrical recess 7 of the first housing part 5. The two elements 11 of a pair can, of course, also be connected to one another—for example, they can be locked together.

Figure 4:
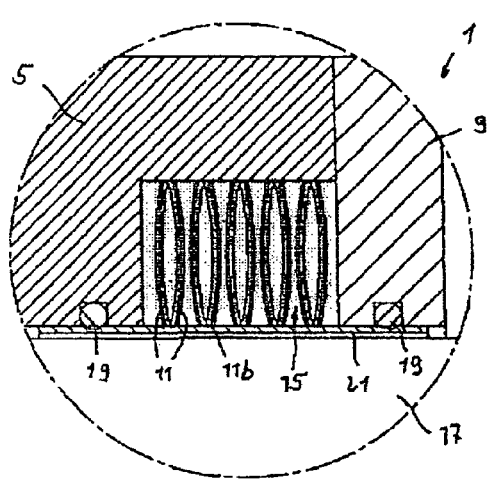
FIG. 4 is a detail enlargement of a third embodiment of a clamping and/or braking device according to the invention, analogous FIG. 3, but using a ring-shaped pressurizable element.

The embodiment of a clamping and/or braking device 1, according to FIG. 4, differs from the embodiment shown in FIG. 3 merely in that the inside ends 11b of the elements 11 do not apply pressure directly on the object 17 to be braked or to be clamped, but rather, via a ring-shaped pressurizable element 21, which is located inside the housing 3. The pressurizable element 21 is so deformed by the forces exerted by the pairs of ring-shaped, plate-like elements 11—in particular, the inside diameter of the pressurizable element 21 is reduced to such an extent that the forces are transferred, at least partially, to the object 17.

This embodiment offers the advantage that the sealing off of the pressure space 15 between the housing and the pressurizable element 21 can take place—for example, again via the sealing elements 19 in the form of O rings.

Figure 5:
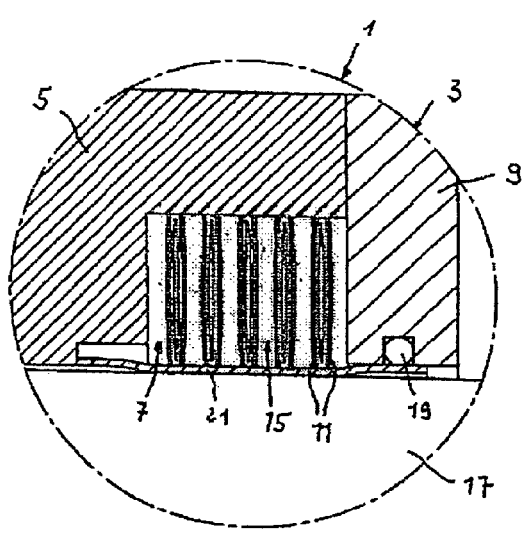
FIG. 5 is a detail enlargement of a fourth embodiment of a clamping and/or braking device according to the invention, analogous FIG. 4, but using a pressurizable element, constructed as one piece with the housing.

As can be seen from FIG. 5, in which another embodiment of a clamping and/or braking device is shown, it is also possible to provide a pressurizable element 21, constructed in an integrated manner with the housing 3, instead of a separate pressurizable element. In the case shown, the recess 7 in the first housing part 5 is designed in such a manner that a thin inside wall is formed, which forms the pressurizable element 21. The wall must be so thin that a sufficient deformation can be guaranteed when forces are exerted by the pairs of ring-shaped, plate-like elements 11 and thus a sufficient transfer of these forces to the object 17. The sealing off of the pressure space 15 can take place here in that the thin wall or the pressurizable element 21 is connected to the second housing part 9 in an essentially airtight manner. For the sealing, a sealing element 19, for example, in the form of an O ring, can again be used.

Of course, such a clamping and/or braking device can also be designed in such a way that the corresponding forces are transferred to an object on a point-like, linear, or non-ring-shaped closed surface, for example, for the production of a clamping and/or braking device for a linear guide.

If one does not interpret the representation in FIG. 5 as an excerpt from an essentially rotation-symmetrical representation, but rather as an excerpt from a representation with a (for example, rectangular) housing 3, in which rectangular, plate-like elements 11 are placed, then a clamping and/or braking device is formed for the pressurization of the surface of an object 17, in which, for example, it may be a track of a linear guide. The housing 3 can, for example, be mounted on a carriage, not depicted in more detail, conducted by means of the object 17 designed as a track. The carriage can grip the track so that the exertion even of high forces on the surface of the object is possible, without lifting the carriage off the track. The mode of functioning of, for example, rectangular, plate-like elements can be deduced analogous to the preceding statements in connection with the annular, plate-like elements.

If a pressurizable element 21 is not used with such an embodiment, then the plate-like elements 1 can be held, with their inside ends 11a, in the housing or connected firmly with it (one piece or detachable). Of course, a sealing off of the pressure space 15, with respect to the object 17, must then again take place. The lateral edges or areas of the rectangular, plate-like elements must also be sealed off to create a pressure space or a "pressure-less" space between the pairs of plate-like elements.

Figure 6:
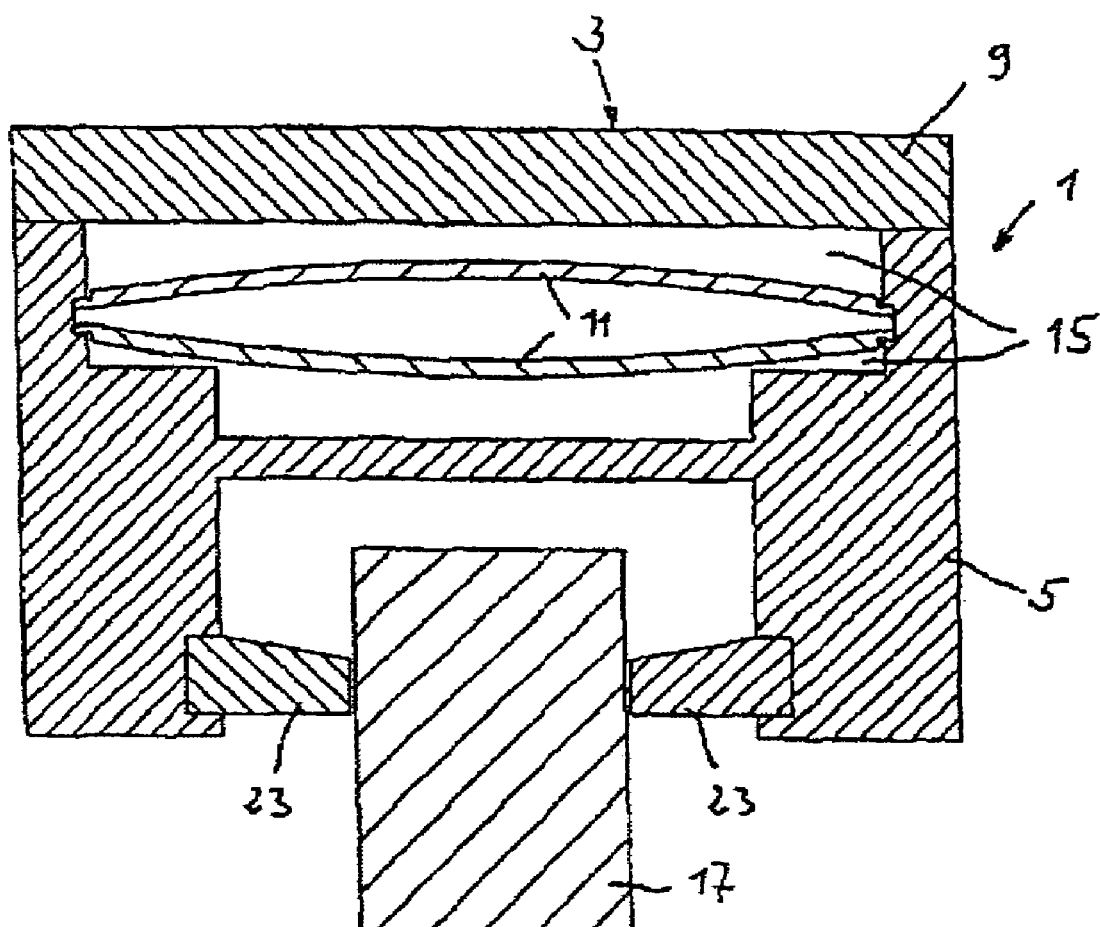
FIG. 6 is a schematic cross section through a fifth embodiment of a clamping and/or braking device according to the invention for the realization of a linear guide.

The embodiment according to FIG. 6 is also a version of a clamping and/or braking device 1, with which a linear guide can be realized. The first housing part 5 is constructed, in this case, with an H-shaped cross section, wherein between the upper legs of the H, a pair of, for example, rectangular, plate-like elements 11 is provided. Since such elements 11 need not be provided with slits, it is possible, of course, to also dispense with corresponding sealing elements. The pressure space 15 is, in turn, formed outside the pair of the plate-like elements 11.

In a pressurization of the pressure space 15, a deformation of the H-shaped housing part 5 is produced, in particular, in the area of the middle crosslink of the H and the transition areas between the crosslink and the lateral legs of the H. In this way, the rigidly constructed, lower legs of the H are moved inwards in the direction of the intermediately placed object 17 and transfer corresponding braking or clamping forces to the object. In this respect, it is possible to provide clamping and/or brake shoes 23 on the insides of the lower legs of the H.

If instead of an H-shaped housing part 5, a U-shaped housing is used, in which one or more (for example, rectangular) plate-like elements, are provided between the legs of the U, with these elements pressing the legs of the U toward the outside with a pressurization, then an "active loosening" of an object, for example, with a linear guide, can be realized. Of course, this can also be attained with an H-shaped housing in that the brake shoes are located on the outsides of the lower legs of the H and they apply pressure on the object, for example, in a groove. Conversely, an "active clamping or braking" can also be produced with a U-shaped housing, if the brake shoes are located on the outsides of the legs of the U and correspondingly apply pressure on the object.

Finally, it should be pointed out that of course, individual features which are described in the preceding only in connection with a specific embodiment can also be combined, if reasonable, with other embodiments also. The described embodiments illustrate the scope of the claims but do not restrict the scope of the claims.

The invention claimed is:
1. A clamping or braking device comprising:
a housing having a stop area;
at least one plate-shaped element held in the housing and supported with a first end with respect to the stop area of the housing, the plate-shaped element for transferring clamping or braking forces with a second end to an object;
wherein the plate-shaped element has at least one bending area which is convex in a starting state, which is pressure-resistant and nevertheless elastically deformable so that the bending area forms an elastic element between the stop area of the housing and the second end of the plate-shaped element;
wherein a pressure space is formed between the convex side of the at least one bending area of the at least one plate-shaped element and the housing and the pressure space can be acted on with excess pressure of a pressure medium which can be supplied to the housing;
wherein the at least one plate-shaped element is so constructed that when the pressure space is acted on with excess pressure, a movement of the second end of the at least one plate-shaped element takes place in the direction of the object as a result of a reduction of the curvature of the bending area; or an increase in the clamping or braking forces which can be transferred to the object by second end of the plate-shaped element is brought about;
wherein the at least one plate-shaped element includes either a) radial slits which open inwardly, wherein the second end of the plate-shaped element is formed by the inside end of the plate-shaped element; or b) radial slits which open outwardly, wherein the second end of the plate-shaped element is formed by the outside end of the plate-shaped element; and
one or more sealing elements disposed along the surface of the at least one plate-shaped element, at least in the area of the radial slits, inside or outside, relative to the pressure space.

2. The device of claim 1 wherein the first end of the at least one plate-shaped element is connected to the housing.

3. The device of claim 1 wherein the first end of the at least one plate-shaped element is supported against the housing.

4. The device of claim 1 wherein the at least one plate-shaped element is constructed in the shape of a circular ring.

5. The device of claim 4 wherein the ring-shaped, plate-shaped element is constructed convex, in the starting state, over essentially the entire radial cross section, wherein essentially an entire ring-shaped wall of the ring-shaped, plate-shaped element serves as the bending area.

6. The device of claim 5 wherein the one or more sealing elements are constructed in the form of a deformable layer on at least part of the surface of the ring-shaped, plate-shaped element.

7. The device of claim 1 wherein the at least one plate-shaped element is constructed in such a way as to limit the bending of the at least one bending area in such a way that after discontinuation of pressure space pressurization with excess pressure, as the result of the elastic effect of at least one bending area, the bending area is moved back to the starting state.

8. The device of claim 1 wherein several plate-shaped elements are provided, whose second ends have a predetermined interval, in order to transfer clamping or braking forces to the object over a prespecified expanded area, and wherein for each plate-shaped element, a separate pressure space or for several or all plate-shaped elements, a common pressure space is constructed.

9. The device of claim 1 wherein at least one pair of plate-shaped elements is provided, whose first and second ends are directly adjacent or are at a close distance to one another and their bending areas are constructed to bend convex outwardly, relative to the other plate-shaped element of the pair, and wherein a common pressure space is provided for the pressurization of the bending areas of the two plate-shaped elements of the pair.

10. The device of claim 9 wherein the plate-shaped elements are constructed in such a manner that they lie close to one another, in an ending state characterized by pressurization at an excess pressure which is greater or equal to a prespecified maximum pressure, with at least one partial surface area of the plate-shaped elements' respective bending areas facing one another, wherein the ending state is characterized by a suitable formation of the bending areas in such a manner that an automatic return from the ending state to the pressure-less starting state takes place upon removal of the excess pressure.

11. A clamping or braking device comprising:

a housing having a stop area;

at least one plate-shaped element held in the housing and supported with a first end with respect to the stop area of the housing, the plate-shaped element for transferring clamping or braking forces with a second end to a pressurizable element, the pressurizable element for transferring the clamping or braking forces to an object;

wherein the plate-shaped element has at least one bending area which is convex in a starting state, which is constructed pressure-resistant and nevertheless elastically deformable so that the bending area forms an elastic element between the stop area of the housing and the pressurizable element;

wherein a pressure space is formed between the convex side of the at least one bending area of the at least one plate-shaped element and the housing and the pressure space can be acted on with excess pressure of a pressure medium which can be supplied to the housing;

wherein the at least one plate-shaped element is so constructed that when the pressure space is acted on with excess pressure provided to attain or increase clamping or braking forces, a movement of the second end of the at least one plate-shaped element takes place in the direction of the pressurizable element as a result of a reduction of the curvature of the bending area; or an increase in the clamping and/or braking forces, which can be transferred to the object by pressurizable element, is brought about;

wherein the at least one plate-shaped element includes either a) radial slits which open inwardly, wherein the second end of the plate-shaped element is formed by the inside end of the plate-shaped element; or b) radial slits which open outwardly, wherein the second end of the plate-shaped element is formed by the outside end of the plate-shaped element; and one or more sealing elements disposed along the surface of the at least one plate-shaped element, at least in the area of the slits, inside or outside, relative to the pressure space.

12. The device of claim 11 wherein the pressurizable element is constructed as either a) one piece with the housing and as a part of the housing, or b) a part connected to the housing in a detachable manner, wherein the pressurizable element is constructed deformable in such a way that with a pressurization of the pressure space, a movement of at least one section of the pressurizable element takes place in the direction of the object or the transferable clamping or braking forces, which were produced by the at least one plate-shaped element, are transferred to the object.

13. The device of claim 11, wherein the first end of the at least one plate-shaped element is connected to the housing.

14. The device of claim 11, wherein the first end of the at least one plate-shaped element is supported, without a firm connection, against the housing, and the second end of the at least one plate-shaped element is supported, without a firm connection, against the pressurizable element.

15. The device of claim 11 wherein the at least one plate-shaped element is constructed in the shape of a circular ring.

16. The device of claim 15 wherein the ring-shaped, plate-shaped element is constructed convex, in the starting state, over essentially the entire radial cross section, wherein essentially an entire ring-shaped wall of the ring-shaped, plate-shaped element serves as a bending area.

17. The device of claim 16 wherein the one or more sealing elements are constructed in the form of a deformable layer on at least part of the surface of the ring-shaped, plate-shaped element.

18. The device of claim 11 wherein the at least one plate-shaped element is constructed in such a way as to limit the bending of the at least one bending area in such a way that after discontinuation of pressure space pressurization with excess pressure, as the result of the elastic effect of at least one bending area, the bending area is moved back to the starting state.

19. The device of claim 11 wherein several plate-shaped elements are provided, whose second ends have a predetermined interval, in order to transfer clamping or braking forces to the object over a prespecified expanded area, and wherein for each plate-shaped element, a separate pressure space or for several or all plate-shaped elements, a common pressure space is constructed.

20. The device of claim 19 wherein the pressurizable element is constructed rigidly in the entire area in which the several plate-shaped elements are active.

21. The device of claim 11 wherein at least one pair of plate-shaped elements is provided, whose first and second ends are directly adjacent or are at a close distance to one another and their bending areas are constructed to bend convex outwardly, relative to the other plate-shaped element of the pair, and wherein a common pressure space is provided for the pressurization of the bending areas of the two plate-shaped elements of the pair.

22. The device of claim 11 wherein the plate-shaped elements are constructed in such a manner that they lie close to one another, in an ending state characterized by pressurization at an excess pressure which is greater or equal to a prespecified maximum pressure, with at least one partial surface area of the plate-shaped elements' bending areas facing one another, wherein the ending state is characterized by a suitable formation of the bending areas in such a manner that an automatic return from the ending state to the pressure-less starting state takes place upon removal of the excess pressure.

* * * * *